Patented June 15, 1948

2,443,287

UNITED STATES PATENT OFFICE 2,443,287

POLYMERIZATION CATALYST

David W. Young, Roselle, and Norman M. Elmore, Elizabeth, N. J., assignors to Standard Oil Development Company, a corporation of Delaware No Drawing. Application May 15, 1943, Serial No. 487,154

3 Claims. (Cl. 252—199)

This application relates to low temperature polymeric materials, relates particularly to low temperature polymerization catalysts, and relates especially to hydrocarbon solutions of Friedel-Crafts catalysts for the low temperature polymerization of olefins.

It has been found possible to polymerize isobutylene and similar isoolefins either alone or in admixture with a wide range of diolefins at temperatures ranging from 0° C. down to temperatures ranging from —136° C. to —160° C. by the application thereto of Friedel-Crafts catalysts in solution to yield high molecular weight rubbery polymers. Difficulty has however been experienced in this polymerization reaction because of the low solubility of the Friedel-Crafts substances in the reaction mixture. Boron trifluoride being gaseous can be bubbled through liquefied olefinic material, but the amount which dissolves in the reaction mixture is relatively small and the catalyst is very easily poisoned by extraneous materials. The more resistant Friedel-Crafts catalysts such as aluminum chloride, aluminum bromide, titanium chloride, and the like, are soluble in alkyl halides such as ethyl or methyl chloride and, when so dissolved, make excellent catalysts which yield very desirable, high molecular weight polymers and interpolymers or copolymers. However, the alkyl halides are expensive and difficult to obtain, and none of the ordinary halides are sufficiently soluble and active in the ordinary hydrocarbons to serve as catalyst solutions.

The present invention provides a Friedel-Crafts catalyst which is soluble in hydrocarbons. This catalyst utilizes the unexpected observation that while neither aluminum chloride nor pure aluminum bromide nor titanium chloride nor titanium bromide are sufficiently soluble at low temperatures in the low boiling hydrocarbons such as propane boiling at 42.7° C., butane boiling at +0.6° C., pentane boiling at +36.2° C., and the like, to yield a potent catalyst, the double salt of aluminum chloride and aluminum bromide is both soluble in the hydrocarbons to a substantial percentage, and, when so dissolved, it produces a very satisfactory catalyst which is effective at relatively very low temperatures and yields a highly satisfactory polymer or interpolymer, or copolymer.

Thus the invention consists in the preparation of a double salt of a plurality of Friedel-Crafts active metal halide substances, dissolving the double salt in a simple hydrocarbon and polymerizing liquefied olefinic material by the application thereto of the Friedel-Crafts double halide catalyst in hydrocarbon solution to yield a high molecular weight rubbery polymer or interpolymer. Other objects and details of the invention will be apparent from the following description:

In practising the present invention, a liquefied olefinic material is prepared consisting preferably of isobutylene, or alternatively, of a lower isoolefin up to 7 or 8 carbon atoms such as 2 methyl butene-1, or 2,3 methyl butene-1, or the like. This material either alone or in admixture with a polyolefin of from 4 to 12 or 14 carbon atoms such as butadiene, isoprene, pentadiene, dimethyl butadiene, dimethallyl, myrcene, or the like, is cooled to a temperature ranging from 0° C. to a temperature as low as —78° C., —100° C., —136° C., or, even as low as —160° C.; by the application of a suitable refrigerant which may be a low boiling liquefied hydrocarbon admixed directly with the olefinic material, or may be solid carbon dioxide mixed with, and in part dissolved in, the olefinic material or may be an external refrigerant in the form of a refrigerating jacket around the reactor. To the cold olefinic material there is then added the catalyst solution utilizing a low boiling hydrocarbon as solvent, propane or the butanes being the preferred solvents, but pentane or ethane or the like being usable. The dissolved Friedel-Crafts catalyst then consists of a double halide of a Friedel-Crafts catalyst. The preferred Friedel-Crafts catalyst is a double halide of aluminum containing both chlorine and bromine; an aluminum chloro bromide such as $AlBr_2Cl$ or $Al_2Br_5Cl$ or a double halide having a chlorine to bromine ratio intermediate between these proportions, or a mixture of a variety of chloro bromides within this range being particularly desirable. Alternatively, a wide range of double halides may be utilized such as the analogous double halides of titanium or the analogous double halides of boron, or the like. Alternatively, substantially any of the double halides prepared from metals of the Friedel-Crafts type as indicated in the article by N. O. Calloway, under the title of "The Friedel-Crafts synthesis," printed in the issue of "Chemical Review," published for the American Chemical Society at Baltimore in 1935 in volume XVII, issue Number 3, the article beginning on page 327; the list being particularly well shown on page 375, may be used.

That is, Friedel-Crafts metal double halides broadly are the usable substances of the present invention when dissolved in an appropriate solvent, preferably a hydrocarbon. Appropriate double salts are those of aluminum such as $Al_2Br_5Cl$ or $AlFBr_2$ or $AlClBr_2$ or $BF_2Br$ or $BF_2Cl$ or $BFBrCl$ or $BFCl_2$ or $TiCl_2Br_2$, and the like utilizing metals selected from the Calloway list; and these are the essence of the present invention.

The catalyst solution, preferably chilled to a temperature below the boiling point of the solvent, is added to the cold olefinic material and a polymerization reaction occurs to yield a high molecular weight polymer which may have a molecular weight ranging from 5000 to 500,000 (as determined by the Staudinger method of which the details are shown in the article in the book under the title "Die Hochmolecularen Organische Verbindunger," on page 56, under the authorship of H. Staudinger, printed in Berlin in 1932); and iodine numbers ranging from a small fraction of 1 up to iodine numbers as high as 40 or 50, as determined by the Wijs method.

The polymers are conveniently recovered by dumping the reaction mixture into a catalyst inactivating material such as warm water or warm soda solution or other alkaline solution or an alcohol mixture, or the like. The simple polymers of the isoolefins are easily prepared by this procedure but they do not react with sulfur or other substances in a curing reaction. The polymers obtainable from mixtures of isoolefins and polyolefins are curable, and they may conveniently be compounded with sulfur, carbon black, curing agents, and the like in much the way in which rubber is compounded; and then cured with a suitable heat treatment to yield materials having excellent tensile strengths, high elongations and good abrasion and flexure resistances.

The double salts of the present invention may be prepared by a considerable number of methods.

METHOD 1

An adequate and satisfactory method for the preparation of the double halides is by a halogen interchange between such compounds as the Friedel-Crafts bromide and carbonyl chloride. In preparing the catalyst according to this method, the Friedel-Crafts halide such as aluminum bromide is mixed in the appropriate proportions with liquid carbonyl chloride. The reaction may go to any one of several stages, according to the amount of carbonyl chloride present and the length of time the reaction is allowed to continue. Thus a mixture of one molecular weight part of aluminum bromide with approximately one molecular weight part of carbonyl chloride will yield a double salt according to the following reaction:

$$AlBr_3 + COCl_2 \rightarrow AlBr_2Cl + COClBr$$

If a larger proportion of carbonyl chloride is used, the reaction will go further $$AlBr_3 + 2COCl_2 \rightarrow AlBrCl_2 + 2COClBr$$

(With a still larger proportion of carbonyl chloride, the reaction will go to completion to yield aluminum chloride and carbonyl bromo chloride which, of course, is undesired for the purposes of the present invention.) This method of preparing the double salts appears to have been first used by A. von Bartal and is reported in full in "A Comprehensive Treatise on Inorganic and Theoretical Chemistry," by J. W. Mellor, volume 5, page 326 (as published by Longmans Green & Company in London in 1924).

METHOD 2

Alternatively, the double salts for the present invention may conveniently be prepared by fusing together proper proportions of the respective compounds according to the molecular proportions desired in the finished substance. Thus, two molecular weight portions of aluminum chloride having a fusing or subliming point of 177.8° C. may be mixed with 1 molecular weight part of aluminum bromide having a fusing point of 97.5° C. in a sealed tube. After fusion, a double salt having a melting point of approximately 142° C. is obtained. The melting point of the resulting salt may vary somewhat according to the proportions of the original component salts utilized.

Either method of preparation yields a fully satisfactory double salt which shows a relatively high solubility in hydrocarbons generally and a high potency as a low temperature polymerization catalyst for olefinic materials. It may be noted in this connection that while aluminum chloride itself has an adequate solubility in the alkyl halides, its solubility in the hydrocarbons such as propane, butane, pentane, and the like is so low that the resulting solution does not have useful power as a catalyst. On the other hand, aluminum bromide, while its solubility in petroleum hydrocarbons is good and high enough to put an adequate amount of Friedel-Crafts halide into a polymerization mixture, its properties are peculiar in that while a solution containing less than 0.5% will yield a satisfactory polymer, the polymerization reaction is extremely slow, and higher concentrations of aluminum bromide dissolved in propane or butane, or the like, produce polymers which are too low in molecular weight to be useful for curing with sulfur and the like to yield a substitute rubber. In sharp contrast to this situation, the double halides retain the relatively high solubility of aluminum bromide in hydrocarbon liquids, and retain the high potency of aluminum chloride as a low temperature polymerization catalyst for olefinic materials.

It may be noted that the double salts are compounds of trivalent metals and with the aluminum double salt, the compound $AlBr_2Cl$ is the preferred form. The other double salt, the $AlBrCl_2$, is less satisfactory since its solubility is lower. The more complex double salts prepared to contain still less chlorine such as $Al_2Br_5Cl$ also show a very high solubility and produce highly desirable clear hydrocarbon solutions which have an excellent potency as low temperature catalysts for olefinic polymerizations. It is not as yet known how little chlorine may be present in the mixture, but present indications are that the salts containing one part of chlorine to 8 of bromine and 1 part of chlorine to 12 of bromine and even one part of chlorine to 15 of bromine are useful.

Solubility determinations of the double salts in propane at two temperatures yielded the following solubility table:

TABLE No. 1

Solubility of catalysts in C. P. propane

| Catalyst Salt | Temp. of Test | Gr./100 ml. Soluble | Temp. of Test | Gr./100 ml. Soluble |
|---|---|---|---|---|
| | °C. | | °C. | |
| AlCl | −44.5 | 0.00 | −103.9 | 0.000 |
| AlBrCl$_2$ | −44.5 | 0.00 | −103.9 | 0.000 |
| AlBr$_2$Cl | −44.5 | 1.78 | −103.9 | 0.070 |
| Al$_2$Br$_5$Cl | −44.5 | 3.15 | −103.9 | 0.109 |

The solubility of these catalyst materials in butane is well shown in Table 2:

TABLE No. 2

*Solubility of catalyst in C. P. butane*

| Catalyst Salt | Temp. of Test °C. | Gr./100 ml. Soluble | Temp. of Test °C. | Gr./100 ml. Soluble |
|---|---|---|---|---|
| $AlCl_3$ | 0.6 | 0.00 | −103.9 | 0.00 |
| $AlBrCl_2$ | 0.6 | 0.00 | −103.9 | 0.00 |
| $AlBr_2Cl$ | 0.6 | 2.15 | −103.9 | 0.117 |
| $Al_2Br_5Cl$ | 0.6 | 5.47 | −103.9 | 0.120 |

These tables show that as the molecular weight of the hydrocarbon solvent is increased the solubility of the mixed halide catalysts also increases for a given temperature. However an unlimited increase in molecular weight of the catalyst solvent is not possible because of the fact that when solvents having above 6 or 7 carbon atoms to the molecule are tried, the polymer formed becomes sticky from the presence of these catalyst solvent hydrocarbons and the processing problems become extremely difficult.

The above Methods 1 and 2 are representative of many ways of preparing the double salts and they show the preparation of the preferred catalyst as double halides of aluminum. However, the process is applicable to many other Friedel-Crafts halide substances to make them soluble in hydrocarbon solvents while retaining a maximum catalytic power.

EXAMPLE 1

A catalyst double salt was prepared according to the procedure of Method 1 above indicated to yield the compound $AlBr_2Cl$ in a conveniently high state of purity. The solid catalyst substance was then crushed and dissolved in liquid propane at a temperature near to its boiling point. This solution was then diluted with additional liquid propane to yield a finished catalyst solution containing 0.56 gram of solid aluminum bromo chloride per 100 milliliters of liquid propane. A mixture was then prepared consisting of 100 parts by weight of isobutylene with 200 parts by weight of liquid propane in a suitable container. Approximately 3 parts by weight of the catalyst solution were then added slowly to the isobutylene-containing-liquid. The polymerization reaction occurred quickly to yield a high-grade polyisobutylene having a molecular weight as determined by the Staudinger method, of approximately 22,000.

EXAMPLE 2

A portion of the aluminum bromo chloride prepared as in Example 1, was dissolved in liquid butane, the solution being diluted to a concentration of approximately 0.84 gram of the solid aluminum bromo chloride per 100 ml. of butane solution. An olefinic mixture was then prepared consisting of approximately 970 parts of isobutylene of 98% purity with 30 parts by weight of isoprene of 86% purity. Approximately 450 parts by weight of solid $CO_2$ was added to the olefinic material and the whole mixture was placed in a reactor provided with effective stirring means. To this mixture there was then added, under conditions of vigorous stirring, approximately 300 parts by weight of the catalyst solution of aluminum bromo chloride in butane, the butane catalyst being previously cooled to a temperature below about −15° C. but not below −35° C. The addition of the catalyst resulted in the production and precipitation of a solid polymer. The reaction was carried to substantial completion, and the polymerized mixture was dumped into warm water to volatilize the catalyst solvent, volatilize unpolymerized olefinic material and to inactivate the catalyst. Approximately 65% of the original olefinic mixture was recovered as solid polymer. The polymer was found to have a molecular weight of about 35,000 and an iodine number of approximately 1.

The solid polymer was recovered from the wash water and milled on the open roll mill to drive off as much as possible of the residual traces of volatile hydrocarbons and to wash out aluminum residues. The solid polymer was then compounded according to the following recipe:

| | Parts |
|---|---|
| Copolymer | 100 |
| Stearic acid | 3 |
| Zinc oxide | 5 |
| Sulfur | 2 |
| Tuads (tetra methyl thiuram disulfide) | 1 |
| Captax (mercaptobenzothiazole) | 0.5 |
| Carbon black | 50.0 |

This material, after compounding according to the above formula, was placed in moulds and cured for 60 minutes at a temperature of 137° C. Test samples cut from the cured material showed a tensile strength of 1975 pounds per square inch, an elongation at break of 730%, and a modulus at 300% elongation of 470 pounds per square inch.

Thus the catalyst and process of the present invention, as applied to mixed olefinic material yields a high-grade synthetic rubber.

EXAMPLE 3

A catalyst was prepared, as in Example 1, consisting of aluminum chloro bromide ($Al_2Br_5Cl$) dissolved in liquid propane, the solution containing 0.21 gram of the solid salt per 100 ml. of solvent. 50 parts by weight of isobutylene was then mixed with 50 parts by weight of powdered solid $CO_2$. When the isobutylene had been cooled to the temperature of the solid $CO_2$, approximately −78° C., approximately 15 parts by weight of the catalyst solution were added to the cold liquid isobutylene, the mixture being stirred gently during the addition of the catalyst solution. The polymerization reaction proceeded promptly to yield a polyisobutylene having a molecular weight of approximately 50,000, in approximately 90% yield.

EXAMPLE 4

A catalyst was prepared by fusing together 2 molecular weight parts of pure aluminum bromide and 1 molecular weight part of pure aluminum chloride, making sure that a homogeneous melt was obtained. This solid melt was then crushed and dissolved in liquid butane at its boiling point and then diluted with additional liquid butane to yield a catalyst solution containing 0.20 gram of solid $AlBr_2Cl$ per 100 ml. of liquid butane (solution not filtered). A mixture was then prepared consisting of approximately 985 parts of isobutylene of 22% purity with 15 parts by weight of isoprene of 96% purity. Approximately 450 parts by weight of solid powdered $CO_2$ was added to the cold olefinic material and the whole mixture was placed in a reactor provided with effective stirring means. To this mixture there was then added under conditions of vigorous stirring, approximately 150 parts by weight of the catalyst solution of AlBr₂Cl in butane, the butane catalyst being previously cooled to a temperature of −103.9° C. The addition of the catalyst resulted in the production of a solid white polymer. The product was treated by the same general method as listed in Example No. 2. The solid compounded polymer (or rubbery substance) after being compounded and cured for 60 minutes, gave tests indicating a tensile strength of 2050 lbs. per square inch, an elongation at break of 710%, and a modulus at 300% elongation of 350 pounds/square inch. The polymer, compounded with 50 parts of carbon black, was also tested in a Goodrich Flexometer for hysteresis properties. Results are listed in the table:

Polymerization of olefins at −78° C. with BBr₂Cl

| Concentration of Catalyst gms./100 ml. | Per cent isoprene in feed | ml. of feed | ml. of catalyst | Yield of Polymer, per cent | Tensile Strength, lbs./sq. inch | Modulus at 300% Elongation | Elongation, per cent |
|---|---|---|---|---|---|---|---|
| 2.0 | 1.5 | 1,000 | 200 | 64 | 2,100 | 640 | 740 |

Time of run in Flexometer_____minutes__ 30
Stroke _____inches__ 0.125
Load _____lbs./sq. inch__ 148
Initial temperature_____°C__ 25
Final temperature_____°C__ 44
Temperature increase_____°C__ 19
Static compression _____ 418
Initial dynamic compression_____ 362
Final dynamic compression_____ 362
Dynamic drift_____ 0.000
Appearance after run_____ Good
Time of cure at 307° F. for Flexometer_____
_____minutes__ 55

Very special notice may be given to the 19° C. temperature increase. Solubility tests indicated that the polymer—before compounding—was a gel or three dimensional type polymer. This statement can be made as the polymer was not completely soluble in heptane at 20° C.

EXAMPLE 5

A boron type double halide catalyst was prepared by reacting together equimolecular parts of boron trifluoride and aluminum chloro bromide according to the following reaction:

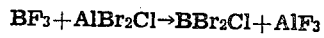

BF₃ + AlBr₂Cl → BBr₂Cl + AlF₃

The reaction proceeded promptly under the conditions shown in the article in "The Journal of the American Chemical Society," volume 62, page 1257 (1940). After completion of the reaction, the material was crushed and treated with a hydrocarbon solvent; specifically propane. The boron bromo chloride was found to be readily soluble in the liquid butane; whereas the aluminum fluoride was substantially or wholly insoluble in the butane. A reaction mixture was prepared according to the following chart:

Thus, the catalyst of the present invention consists of a solution of a double salt of a Friedel-Crafts halide in solution in a low boiling, low freezing hydrocarbon solvent; and the process of the invention consists in the polymerization of olefinic material by a catalyst solution of double salts of Friedel-Crafts halide substances in hydrocarbon solvent.

While there are above disclosed but a limited number of embodiments of the catalyst and process of the invention, it is possible to produce still other embodiments without departing from the inventive concept herein disclosed and it is therefore desired that only such limitations be imposed on the appended claims as are stated therein.

The invention claimed is:

1. A liquid low temperature catalyst consisting essentially of a C₃ to C₄ saturated aliphatic hydrocarbon solution of an aluminum bromo chloride composition in which the molecular weight ratio of bromine to chlorine is within the range of 2:1 to 5:1, said composition having the property of remaining in solution in the solvent in active catalytic proportions at a temperature substantially below 0.6° C.

2. A liquid catalyst according to claim 1 wherein the compound is aluminum dibromo chloride.

3. A liquid catalyst according to claim 1 wherein the compound is di-aluminum pentabromo chloride.

DAVID W. YOUNG.
NORMAN M. ELMORE.

REFERENCES CITED

The following references are of record in the file of this patent:

UNITED STATES PATENTS

| Number | Name | Date |
|---|---|---|
| 1,671,517 | Edelenau | May 29, 1928 |
| 2,122,826 | Van Peski | July 5, 1938 |
| 2,142,980 | Huijser | Jan. 3, 1939 |
| 2,286,129 | Veltman | June 9, 1942 |